United States Patent [19]

Mast et al.

[11] 4,201,829

[45] May 6, 1980

[54] METAL PLATED THERMOPLASTIC ARTICLES

[75] Inventors: William C. Mast, Stow; Richard G. Bauer, Kent, both of Ohio

[73] Assignee: The Goodyear Tire & Rubber Company, Akron, Ohio

[21] Appl. No.: 933,245

[22] Filed: Aug. 14, 1978

Related U.S. Application Data

[63] Continuation-in-part of Ser. No. 837,079, Sep. 28, 1977, abandoned, which is a continuation-in-part of Ser. No. 656,471, Feb. 9, 1976, abandoned, which is a continuation-in-part of Ser. No. 528,387, Nov. 29, 1974, abandoned.

[51] Int. Cl.$^2$ ............................................. B32B 15/08
[52] U.S. Cl. .................................. 428/332; 428/462; 428/463; 525/84; 525/87
[58] Field of Search ............... 428/462, 463, 461, 332; 260/876 R, 890, 891

[56] References Cited

U.S. PATENT DOCUMENTS

| | | | |
|---|---|---|---|
| 2,646,417 | 7/1953 | Jennings | 260/891 |
| 2,719,137 | 9/1955 | Tawney | 260/890 |
| 3,287,443 | 1/1966 | Saito et al. | 260/876 R |
| 3,475,516 | 10/1969 | Bauer et al. | 260/876 R |
| 3,650,803 | 3/1972 | Lin | 428/462 |
| 3,657,391 | 4/1972 | Curfman | 260/876 R |

*Primary Examiner*—J. Ziegler
*Attorney, Agent, or Firm*—John J. Ward

[57] ABSTRACT

There is provided metal plated, non-burning molded thermoplastic articles comprised of (A) a substrate consisting of a molded non-burning thermoplastic blend of (1) an admixture of (a) a grafted rubbery copolymer and (b) a resinous copolymer and (2) a vinyl chloride homopolymer of copolymer thereof and (B) a metal coating deposited on and bonded to the substrate (A).

6 Claims, No Drawings

METAL PLATED THERMOPLASTIC ARTICLES

This invention is a continuation-in-part of our Application Ser. No. 837,079, filed Sept. 28, 1977, which was a continuation-in-part of our Application Ser. No. 656,471, filed Feb. 9, 1976, which was a continuation-in-part of our Application Ser. No. 528,387, filed Nov. 29, 1974, all of which are now abandoned.

This invention relates to metal platable, impact resistant, non-burning thermoplastic compositions comprising blends of (A) an admixture of (1) a rubbery diolefin/styrene monomer copolymer having grafted thereto from 30 to 50 parts by weight based on 100 parts by weight of the rubbery graft copolymer of a compatibilizing resin and (2) a resinous methacrylic acid ester monomer/styrene monomer/acrylonitrile monomer terpolymer with (B) vinyl chloride homopolymer or copolymers thereof containing up to about 15 parts by weight based on the weight of the copolymer of a copolymerizable comonomer. More particularly this invention relates to such compositions wherein the admixture (A) of the blend comprises from about 40 to about 60 parts by weight based on 100 parts by weight of the blend and the vinyl chloride homopolymer a copolymer (B) of the blend comprises from about 60 to about 40 parts by weight based on 100 parts by weight of the blend. Most particularly the invention relates to molded articles produced from said compositions plated with various metals which plated articles exhibit unexpected high bond strength between the metal plating and the thermoplastic substrate.

The preparation of grafted rubbery diolefin/styrene copolymers, resinous methylmethacrylate/styrene/acrylonitrile terpolymers and blends of the grafted rubbery copolymers and resinous terpolymers to produce what is hereinafter referred to throughout this specification as MBAS compositions has been described in the patent literature (U.S. Pat. No. 3,475,516) and in subsequent articles such as "Advances in Chemistry Series" No. 99, pages 237–250 (1971).

The above noted patent states ". . . the present invention is directed to the blending of a clear rubbery copolymer resulting from the polymerization of a mixture comprising from 50 to 5 parts of methyl methacrylate and from 50 to 95 parts of butadiene, with at least one other polymer, for example, a clear resinous copolymer, resulting from the polymerization of a mixture comprising from 95 to 5 parts of methyl methacrylate and from 5 parts to 95 parts of styrene, wherein either the rubbery or the resinous clear polymer has grafted thereto a clear graft polymer which promotes the compatibility of these clear polymers when intimately mixed. The compatibilizing clear graft polymers that may be grafted to the clear resinous polymers are the clear copolymers resulting from the polymerization of a mixture comprising 95 to 5 parts of butadiene or isoprene and 5 parts to 95 parts of methyl methacrylate. The compatibilizing clear graft polymers that may be grafted to the clear rubbery polymers are the homopolymers of methyl methacrylate as well as the clear copolymers resulting from the polymerization of a mixture comprising 5 to 95 parts of methyl methacrylate and from 95 to 5 parts of styrene, or a methyl styrene. All parts indicated throughout are per 100 parts of monomers reacted.

Clear copolymers are made in a conventional manner as described, for example, in Chemical Reviews 46 191 (1950); Journal Polymer Science 26, 9–22 (1957); Journal of Applied Polymer Science 5, 337–348 (1961); U.S. Pat. Nos. 2,851,446;-447;-448; 2,984,650; 2,984,651; and British Plastics pgs. 552 to 525 (December 1958).

The amount of clear graft polymer that may be grafted or added to the clear resinous polymer may range from about 15 parts to about 30 parts per 100 parts of resinous polymer and the amount of graft polymer that may be grafted to the rubbery polymer may range from about 10 parts to about 35 parts per 100 parts of clear rubbery polymer. More specifically the amount of clear polymer that may be grafted to the clear rubbery polymer, or added to the clear resinous polymer may range from about 20 to about 25 parts per 100 parts of clear rubbery or clear resinous polymer being compatibilized by the clear graft polymer.

The amount of clear grafted, or modified resin component to be blended with the clear unmodified rubber component may range from 1 to 6 parts per part of unmodified rubber and the amount of unmodified resin to be blended with the grafted rubber may range from 1 to 5 parts per part of unmodified resin. The resulting blends will range from flexible to stiff depending upon the amount of resin component present in the blend.

Examples of clear rubbery polymers which may be used in producing the clear, shatter-proof plastic of this invention are clear copolymers resulting from the polymerization of a mixture comprising from 50 to 5 parts of methyl methacrylate and from 50 to 95 parts of butadiene and/or isoprene, each monomer being present per 100 parts of monomers present. Other clear rubbery polymers that may be used are the copolymers resulting from the polymerization of a mixture comprising from 50 to 95 parts of 2-ethyl hexylacrylate and from 50 to 5 parts of styrene, the monomers being present per 100 parts of monomers used.

Examples of clear resinous polymers that may be used in the present invention and which may be made compatible with the clear rubbery polymers hereinbefore described are the clear copolymers resulting from the polymerization of a mixture comprising 50 to 95 parts of methyl methacrylate and from 50 to 5 parts of styrene, and/or alpha-methyl styrene, wherein the monomers are present per 100 parts of monomers used. Another example of a clear resinous polymer is the homopolymer resulting from the polymerization of methyl methacrylate.

The following table sets forth Tg values for representative polymers in the rubbery and in the resinous classes described above. Azeotropic polymeric compositions are calculated in the conventional manner as shown, for example, in JACS 66, 2050 (1944).

TABLE I

| POLYMER | Tg VALUE °F. |
|---|---|
| Methyl Methacrylate/Butadiene (Azeotrope 48/52) | |
| 1. (10/90) | −103 |
| 2. (20/80) | −70 |
| 3. (30/70) | −60 |
| 4. (40/60) | −27 |
| 5. (50/50) | −8 |
| Methyl Methacrylate/Isoprene (Azeotrope 39/61) | |
| 6. (10/90) | −81 |
| 7. (20/80) | −61 |
| 8. (30/70) | −40 |
| 9. (40/60) | −17 |
| 10. (50/50) | 10 |
| 2-ethyl hexylacrylate/Styrene (Azeotrope 12.5/87.5) | |

TABLE I-continued

| POLYMER | Tg VALUE °F. |
|---|---|
| 11. (90/10) | −51 |
| 12. (80/20) | −33 |
| 13. (70/30) | −8 |
| 14. (60/40) | 10 |
| 15. (50/50) | 34 |
| Methyl Methacrylate/Styrene (Azeotrope 46/54) | |
| 16. (90/10) | 217 |
| 17. (80/20) | 217 |
| 18. (70/30) | 217 |
| 19. (60/40) | 217 |
| 20. (50/50) | 217 |
| Methyl Methacrylate/Alpha methyl Styrene (Azeotrope 59/41) | |
| 21. (90/10) | 234 |
| 22. (80/20) | 244 |
| 23. (70/30) | 256 |
| 24. (60/40) | 268 |
| 25. (50/50) | 279 |
| 26. Polymethyl methacrylate (Isotactic) | 44 |
| 27. Polymethyl methacrylate (Atactic) | 104 |

The following are a few examples of polymers made compatible by forming a resin in the presence of a rubber, the compatible polymer having a Tg value representing the rubber component and a Tg value representing the graft resin component.

1. Polymethyl methacrylate formed in the presence of methyl methacrylate/butadiene, (10/90).
2. Polymethyl methacrylate formed in the presence of methyl methacrylate/butadiene, (20/80).
3. Polymethyl methacrylate formed in the presence of methyl methacrylate/butadiene, (30/70).
4. Polymethyl methacrylate formed in the presence of methyl methacrylate/butadiene, (40/60).
5. Polymethyl methacrylate formed in the presence of methyl methacrylate/butadiene, (50/50).
6. Polymethyl methacrylate formed in the presence of methyl methacrylate/isoprene, (10/90).
7. Polymethyl methacrylate formed in the presence of methyl methacrylate/isoprene, (20/80).
8. Polymethyl methacrylate formed in the presence of methyl methacrylate/isoprene, (30/70).
9. Polymethyl methacrylate formed in the presence of methyl methacrylate/isoprene, (40/60).
10. Polymethyl methacrylate formed in the presence of methyl methacrylate/isoprene, (50/50).
11. Polymethyl methacrylate formed in the presence of 2-ethyl hexylacrylate/styrene, (90/10).
12. Polymethyl methacrylate formed in the presence of 2-ethyl hexylacrylate/styrene, (80/20).
13. Polymethyl methacrylate formed in the presence of 2-ethyl hexylacrylate/styrene, (70/30).
14. Polymethyl methacrylate formed in the presence of 2-ethyl hexylacrylate/styrene, (60/40).
15. Polymethyl methacrylate formed in the presence of 2-ethyl hexylacrylate/styrene, (50/50).
16. Methyl methacrylate/styrene 50/50 copolymer formed in the presence of methyl methacrylate/butadiene, (10/90).
17. Methyl methacrylate/styrene 50/50 copolymer formed in the presence of methyl methacrylate/butadiene, (20/80).
18. Methyl methacrylate/styrene 50/50 copolymer formed in the presence of methyl methacrylate/butadiene, (30/70).
19. Methyl methacrylate/styrene 50/50 copolymer formed in the presence of methyl methacrylate/butadiene, (40/60).
20. Methyl methacrylate/styrene 50/50 copolymer formed in the presence of methyl methacrylate/butadiene, (50/50).
21. Methyl methacrylate/styrene 50/50 copolymer formed in the presence of methyl methacrylate/isoprene, (10/90).
22. Methyl methacrylate/styrene 50/50 copolymer formed in the presence of methyl methacrylate/isoprene, (20/80).
23. Methyl methacrylate/styrene 50/50 copolymer formed in the presence of methyl methacrylate/isoprene, (30/70).
24. Methyl methacrylate/styrene 50/50 copolymer formed in the presence of methyl methacrylate/isoprene, (40/60).
25. Methyl methacrylate/styrene 50/50 copolymer formed in the presence of methyl methacrylate/isoprene, (50/50).
26. Methyl methacrylate/styrene 50/50 copolymer formed in the presence of 2-ethyl hexylacrylate/styrene, (90/10).
27. Methyl methacrylate/styrene 50/50 copolymer formed in the presence of 2-ethyl hexylacrylate/styrene, (80/20).
28. Methyl methacrylate/styrene 50/50 copolymer formed in the presence of 2-ethyl hexylacrylate/styrene, (70/30).
29. Methyl methacrylate/styrene 50/50 copolymer formed in the presence of 2-ethyl hexylacrylate/styrene, (60/40).
30. Methyl methacrylate/styrene 50/50 copolymer formed in the presence of 2-ethyl hexylacrylate/styrene, (50/50).

An example of a clear, shatter-proof plastic that may be made in accordance with the present invention having high resistance to impact and the other properties listed in the chart above is made by blending 64 parts of an 85/15 methyl methacrylate/styrene copolymer with 36 parts of a 52/48 butadiene methyl methacrylate clear copolymer known as an azeotropic polymer to which butadiene methyl methacrylate clear copolymer as shown by Example III in Table 2.

The following Example is exemplary of the clear resinous polymer that may be used as one of the components in making the clear shatterproof plastic of this invention. All parts are by weight unless otherwise indicated.

EXAMPLE I

Resinous Polymers

The methyl methacrylate/styrene resin is made in accordance with the following formula.

| Ingredient | Purpose | Parts | Range |
|---|---|---|---|
| Water | Medium | 180 | 100–250 |
| Sodium Salt of the Phosphate Ester of the Condensate of Nonylphenol and Polyethylene Oxide | Emulsifier | 4 | 1.5–12 |
| $K_2S_2O_8$ | Initiator | 0.20 | 0.02–0.5 |
| Methyl Methacrylate | Monomer | 85.0 | |
| Styrene | Monomer | 15.0 | |
| Tert. Butyl Mercaptan | Modifier | 0.20 | 0–1.0 |
| Sodium Dimethyl Dithio- | Short-stopper | 0.50 | 0–1.0 |

| Ingredient | Purpose | Parts | Range |
|---|---|---|---|
| carbamate | | | |
| Tris (Nonylphenoxy) Phosphite | Antioxidant (As a dispersion) | 0.75 | 0–3.0 |
| 2-hydroxy-4-methoxy-benzophenone | UV Stabilization (As a dispersion) | 0.75 | 0–3.0 |

The conditions of polymerization of the monomers listed above are any of those normally used in preparing emulsion polymers of this nature. For example, the first 3 components are charged to a glass lined reactor and the atmosphere in the reactor is flushed twice with nitrogen to which reactor then is added the next 3 components listed above. The reaction is carried on at a temperature of about 122° F. for a period of about 6 hours or until about 96% of the monomers are converted to polymers to form an emulsion containing about 34 solids. The reaction is then stopped by charging the reactor with the remainder of the components listed above.

The following Example is exemplary of the rubbery polymer that may be used in combination with a resinous polymer in making the shatter-proof plastic of this invention.

EXAMPLE II

Rubbery Polymer

The butadiene/methyl methacrylate rubbery copolymer is made in accordance with the following formula.

| Ingredient | Purpose | Parts | Range |
|---|---|---|---|
| Water | Medium | 180 | 100–250 |
| Sodium Salt of the Phosphate Ester of the Condensate of Nonylphenol and Polyethylene Oxide | Emulsifier | 4.0 | 1.5–12 |
| K$_2$S$_2$O$_8$ | Initiator | 0.20 | 0.02–0.5 |
| Methyl Methacrylate | Monomer (48%) | 37.0 | |
| Mixture of Tert. Alkyl Mercaptans | Modifier | 0.155 | 0.0–1.0 |
| Butadiene | Monomer (52%) | 41.0 | |
| Methyl Methacrylate | Graft Monomer (22%) | 22.0 | |
| Sodium Dimethyl Dithio-carbamate | Short-stopper | 0.50 | 0–1.0 |
| Tris (Nonylphenoxy) Phosphite | Antioxidant (As a dispersion) | 0.75 | 0.0–3.0 |
| 2-hydroxy-4-methoxy-benzophenone | UV Stabilization (As a dispersion) | 0.75 | 0.0–3.0 |

The first 3 components are charged to a glass lined reactor and then flushed with nitrogen after which the next 3 components are charged to the reactor and reacted to 98% conversion in about 15 hours at a temperature of about 122° F. To this reaction mixture is then charged the methyl methacrylate monomer and the reaction continued until the graft polymer has been formed. To this graft polymer latex is then added the remainder of the components listed above.

EXAMPLE III

Resin/Rubber Blending

The latices made in accordance with Examples I and II above are then coagulated in a 72/28 resin/rubber ratio in a 2% magnesium sulfate solution at 90° C., filtered and dried.

The 72/28 coagulated blend, made in the manner described above, is then milled at 325° F. for at least 1 minute to obtain a sheet of clear shatter-proof plastic."

While the blended thermoplastic compositions of the above cited U.S. Pat. No. 3,475,516 exhibit excellent light transmittance, impact resistance and other desirable properties they do not provide the equally desirable characteristics of being metal platable, possessing high metal to thermoplastic bond strengths and being non-burning, characteristics so absolutely essential in many home and automotive applications.

It is therefore an object of the present invention to provide metal plated, non-burning molded thermoplastic articles having high bond strength between the metal coating and the thermoplastic substrate and further characterized by possessing excellent light transmittance and impact resistance. It is a further object of the present invention to provide thermoplastic compositions characterized as being metal platable, non-burning, highly light transmittant and impact resistant and which when plated form excellent bond strengths between the thermoplastic substrate and the plated metal coating.

In accordance with the present invention there are now provided metal plated, non-burning molded thermoplastic articles consisting of (A) a molded substrate of metal platable, non-burning, light transmittant thermoplastic material comprising a blend of (1) an admixture of (a) 100 parts by weight of a rubbery copolymer resulting from the copolymerization of a mixture of a diolefin monomer and a styrene monomer having grafted thereto from 30 to 50 parts by weight, based on 100 parts by weight of the grafted rubber copolymer, of a terpolymer resulting from the copolymerization of a mixture of a methacrylic acid ester monomer, a styrene monomer and an acrylonitrile monomer, and (b) from 100 to 200 parts by weight of a resinous copolymer resulting from the copolymerization of a mixture of a methacrylic acid ester monomer, a styrene monomer and an acrylonitrile monomer and (2) a vinyl chloride polymer selected from the group consisting of vinyl chloride homopolymer and vinyl chloride copolymers containing up to about 15 parts by weight based on the weight of the copolymer of a copolymerizable comonomer and wherein the admixture of (1) ranges from about 40 to 60 parts by weight based on 100 parts by weight of the total blend and the vinyl chloride polymer ranges from about 60 to about 40 parts by weight based on 100 parts by weight of the total blend, and (B) a metal coating deposited on and bonded to the surface of said molded substrate, said metal coatings being selected from the group of metals consisting of copper, nickel, chromium and alloys containing copper, nickel and chromium and wherein the peel adhesion strength between the metal coating and the thermoplastic substrate ranges from about 5.0 to about 10.0 pounds as measured by the ASTM D-429 Method B test procedure.

Further in accordance with the present invention there has been discovered thermoplastic compositions comprising blends of (A) an admixture of (1) 100 parts by weight of a rubbery copolymer resulting from the polymerization of a mixture of a diolefin monomer and a styrene monomer having grafted thereto from 30 to 50 parts by weight, based on 100 parts by weight of the grafted rubbery copolymer, of a terpolymer resulting from the polymerization of a mixture of a methacrylic acid ester monomer, a styrene monomer and an acrylonitrile monomer in the presence of the rubbery copolymer and (2) from 100 to 200 parts by weight of a resinous terpolymer resulting from the polymerization of a mixture of a methacrylic acid ester monomer, a styrene monomer and an acrylonitrile monomer and (3) vinyl chloride homopolymer or copolymers thereof containing up to about 15 parts by weight based on the weight of the copolymer of a copolymerizable comonomer wherein the weight ratio of (A) to (B) ranges from 60/40 to 40/60 and which thermoplastic compositions are metal platable, exhibit totally unexpected high metal plate to thermoplastic bond strengths and are non-burning.

Various monomeric methacrylic acid esters can be used to produce the MBAS composition. The most preferred monomers are those selected from the group consisting of methyl methacrylate, ethyl methacrylate, n-butyl methacrylate, n-pentyl methacrylate, cyclohexyl methacrylate, isobutyl methacrylate and phenyl methacrylate. The methacrylate portion of the MBAS composition normally comprises from about 20 to 25 parts by weight of the total MBAS composition.

The diolefin monomer of the MBAS resin can likewise vary widely. The most preferred diolefins are those selected from the group consisting of butadiene, isoprene, 2,3-dimethylbutadiene, 1,3-pentadiene and chloroprene. The diolefin monomer generally makes up from 10 to 30 parts by weight of the total MBAS composition.

Various acrylonitrile monomers can be used to produce the MBAS composition. The most preferred acrylonitrile monomers are those selected from the group consisting of acrylonitrile, methacrylonitrile and ethacrylonitrile. The acrylonitrile monomers generally make up from about 20 to about 25 parts by weight of the total MBAS composition.

The styrene monomer used in the MBAS resin blends can be styrene or various substituted styrene monomers. The most preferred styrene monomers are those selected from the group consisting of styrene, α-methyl styrene, o-methyl styrene, m-methyl styrene, p-methyl styrene, o-isobutyl styrene, m-isobutyl styrene, p-isobutyl styrene, o-t-butyl styrene, m-t-butyl styrene, p-t-butyl styrene, monochlorostyrene, dichlorostyrene and ethyl styrene. The styrene monomer normally comprises from about 30 to about 40 parts by weight of the total MBAS composition.

Vinyl chloride homopolymer and copolymers of vinyl chloride containing up to about 15 percent by weight based on the weight of the copolymer of a copolymerizable comonomer can be used. Preferred copolymerizable comonomers are those selected from the group consisting of vinyl acetate, vinyl stearate, monoesters and diesters of fumaric, maleic, itaconic and aconitic acids prepared from alcohols having from 1 to 16 carbon atoms and vinyl ethers having the structural formula $CH_2=CH-O-R^1$ wherein $R^1$ is an alkyl radical having from 1 to 8 carbon atoms. Polyvinylchloride, vinyl chloride homopolymer, i.e., is the preferred polymer. Representative examples of vinylchloride copolymers are those resulting from the polymerization of a mixture of vinyl chloride and vinyl acetate, such as VYHH (an 87/13 vinyl chloride/vinyl acetate copolymer sold by Union Carbide Company. Representative examples of vinyl ethers are methyl vinyl ether, isopentyl vinyl ether and n-octyl vinyl ether. Representative examples of ester comonomers useful in the present invention are methyl hydrogen fumarate, methyl hydrogen maleate, ethyl hydrogen itaconate, propyl hydrogen aconitate, stearyl hydrogen fumarate, nonyl hydrogen itaconate, dimethyl fumarate, distearyl itaconate, and methyl ethyl maleate.

The MBAS compositions and the polyvinylchloride homopolymer and copolymers can be dry blended together in the proportion desired to achieve the thermoplastic compositions of the present invention. Ratios of the MBAS resin blends to the polyvinylchloride homopolymer or copolymer can range from about 60 MBAS/40 PVC to about 40 MBAS/60 PVC. The most preferred proportion is a 50/50 blend of MBAS and PVC.

The invention is more concretely described with reference to the examples below wherein all parts and percentages are by weight unless otherwise specified.

EXAMPLE IV

Grafted Rubbery Copolymer

A grafted rubbery butadiene/styrene copolymer useful in the present invention was prepared in accordance with the following formula:

| Ingredient | Purpose | Parts by Weight |
|---|---|---|
| Water | Medium | 177.0 |
| Sodium salt of the sulfate ester of the condensate of nonylphenol and polyethylene oxide[a] | Emulsifier | 12.5 |
| Sodium salt of ethylenediamine tetraacetic acid | Chelating agent | 0.1 |
| $K_2S_2O_8$ | Iniator | 0.3 |
| Styrene | Monomer | 13.0 |
| Tert.-dodecyl mercaptan | Modifier | 0.3 |
| Butadiene | Monomer | 52.0 |
| Methylmethacrylate | Graft monomer | 10.5 |
| Styrene | Graft monomer | 14.0 |
| Acrylonitrile | Graft monomer | 10.5 |
| $H_2O_2$ | Shortstopping agent | 0.7 |

[a] A 28% aqueous solution

The first five ingredients were charged to a glass lined reaction vessel and the vessel sealed and flushed with nitrogen. The next two ingredients were then charged to the vessel and the polymerization carried out at a temperature of about 140° F. When the reaction was complete the graft monomers were then added to the vessel and the polymerization continued. When sampling of the reaction mixture indicated that it contained about a 27 parts by weight solids content based on 100 parts by weight of the ingredients charged, the reaction was terminated by the addition of $H_2O_2$. The resulting latex product was discharged and stored for later blending with the resinous copolymer from Example V below.

EXAMPLE V

Resinous Copolymer

A resinous copolymer useful in the present invention was prepared in accordance with the following formula:

| Ingredient | Purpose | Parts by Weight |
|---|---|---|
| Water | Medium | 200.0 |
| Sodium salt of the sulfate ester of the condensate of nonylphenol and polyethylene oxide[a] | Emulsifier | 12.5 |
| Sodium salt of | Chelating agent | 0.05 |

-continued

| Ingredient | Purpose | Parts by Weight |
| --- | --- | --- |
| ethylenediamine tetraacetic acid | | |
| $K_2S_2O_8$ | Initiator | 0.2 |
| Methylmethacrylate | Monomer | 30.0 |
| Styrene | Monomer | 40.0 |
| Acrylonitrile | Monomer | 30.0 |
| Tert.-dodecyl mercaptan | Modifier | 0.6 |
| $H_2O_2$ | Shortstopping agent | 0.7 |

(a) A 28% aqueous solution

The resinous copolymer was prepared from the above formulation in a manner similar to that described in Example IV. The first four ingredients were charged to the glass lined reaction vessel, the vessel sealed and flushed with nitrogen. The vessel was then pressured with nitrogen to about 5 pounds per square inch (psi) pressure and the temperature of the ingredients raised to about 185° F. To the vessel was then charged the monomeric ingredients over a period of about two hours. After complete charging of the monomeric ingredients the polymerization reaction was continued until the reaction mixture had attained about a 33 parts by weight solid content based on 100 parts by weight of the ingredients charged. At this point the $H_2O_2$ was added to terminate the reaction. The product in latex form was then discharged from the vessel.

EXAMPLE VI

Rubber/Resin Blending

The latices of the graft rubbery copolymer and resinous copolymer from Examples IV and V above were then coagulated in a 65/35 resin/rubber ratio in a 2 percent magnesium sulfate solution at a temperature ranging from 150° to 200° F. and then subjected to centrifugal separation and dried. This admixture was given the identifying number P6448-157 (MBAS) and is the same MBAS composition employed in the formulations set forth in Table I following Example VII hereinbelow. Based on 100 parts by weight of this MBAS composition the final compositional makeup of the MBAS was as follows:

| Monomeric Repeating Unit | Parts by Weight |
| --- | --- |
| Butadiene | 18.2 |
| Methylmethacrylate | 23.2 |
| Acrylonitrile | 23.2 |
| Styrene | 35.4 |

EXAMPLE VII

Compounded examples of blends of polyvinylchloride homopolymer and the MBAS composition of Example VI were investigated over a wide composition range including both ends of the MBAS/PVC spectrum in order to demonstrate the surprising and totally unexpected results provided by the blend of the instant invention. Thus eight compounded samples were prepared in which blends containing variable parts of Pliovic BK-80 (PVC) and the MBAS composition of Example VI were mixed with 3.5 parts of powdered barium/cadmium/zinc stabilizer (sold as Mark 99 by Argus Chemical Company), 1.0 part of a proprietary phosphite chelator (Ferro 8V1, sold by Ferro Corporation), 0.6 part of Montanic Acid Wax (sold as Wax OP by American Hoechst), 0.15 part of the low molecular weight polyethylene (sold as Wax PA 190 by American Hoechst) and 0.3 part of stearic acid (sold as Hystrene S-9718 by Humko Corporation).

The PVC and the MBAS composition were dry blended in a Henschel mixer at room temperature. The thermal stabilizers (Mark 99 and Ferro 8V1) were added to the mix while the mix was at a temperature of 140° F. The mix was then raised to a temperature of 180° F. at which time the lubricants (stearic acid, acid was and low molecular weight polyethylene) were added. Mixing was continued to a temperature of 200° F. The mix was then placed in a Hobart mixer where the blend was mixed for an additional 5 minutes. The blend was then cooled to room temperature, forming a dry blend. The dry blend was then placed on a mill and heated to melt temperature at 330° F. for 3 minutes. The mix was cooled and cut into pieces which were compression molded into sheets at 340° F. During molding, 10 minutes were spent on warm-up and 10 minutes were spent at 340° F., followed by cooling to room temperature. Physical property tests were then carried out on the cooled molded sheets. Test recipes are shown in Table I. The test results are shown in Table II.

The compositions prepared as shown and described in Example VII and Table I were tested for physical properties. Impact resistance was measured using the notched Izod impact and the Gardner impact to fracture. Impact tests are methods for determining the behavior of materials subjected to shock loading in bending tension or compression. The quality usually measured is the energy absorbed in breaking the specimen in a single blow.

The notched Izod impact is the energy expended in breaking in one blow the rigid plastic specimen which has been notched (ASTM D-256). The specimen is supported as a cantilever boom and is struck by a weight at the end of a pendulum. The impact strength is determined from the amount of energy required to fracture the specimen.

The Gardner impact test measures the resistance of surfaces or sheet material to an impact. This test is a method for determining the energy absorption characteristics of a material subjected to shock loading. In this test a metal ball or dart of known weight is dropped on a specimen at regularly increasing heights and the height of the drop which produces failure in the specimen is recorded in inches.

The heat distortion temperature is the temperature at which a standard test bar deflects 0.01 inch under a maximum fiber stress of either 66 pounds per square inch or 264 pounds per square inch (ASTM D-648).

Flammability was determined as described in ASTM D-635-63.

Hardness is the measure of materials resistance to localized plastic deformation. The Rockwell hardness (ASTM D-785) is derived from the increase in depth of impression as the load on a ball indentor is increased from a fixed minor load to a fixed major load and then returned to the minor load. The test specifies that this be the indentation remaining 15 seconds after the major load is released to a standard 10 milligram minor load. The higher the reading the harder the material. Flexural modulus was determined according to the method described in ASTM D-790. Tensile strength was determined as described in ASTM D-638.

Shore Hardness (ASTM D-676, D-1484 and D-1706) is very similar to the Rockwell Hardness.

Percent light transmission and percent haze were measured according to ASTM D-1003. For the sake of defining the invention, specimens with haze values greater than 55 percent were considered as translucent rather than transparent.

There are many applications where impact resistance, metal platability and flame retardancy along with transparency in selective areas are the desired physical characteristics of the thermoplastic, for example, automotive dash panels where the instruments can be viewed through a transparent section. Other examples include lights for automobiles, boats, aircraft, etc. of one piece construction, portions of which are plated and other portions of which are transparent. Examples of such compositions are given in Table II.

All the polymer samples were initially coated with a primary metal using an electroless process, to which primary metal, others metals and alloys can be bonded. If desired, an electrolytic process can be used to coat the primary metal. The preferred primary metal is nickel. Once the primary metal has been bonded to the polymer substrate other metals such as copper, chromium, nickel and alloys containing copper, nickel and chromium can be used to complete the plating process. The metal coatings can range from about 5 to about 10 mils (0.005 to 0.10 inch) in thickness, depending on the particular application or article.

Samples metal plated were plated using the McDermid Room Temperature process PL-401 for ABS resins. The samples were placed in acid cleaner for one minute at 135° F., etched for 5 minutes at 140° F. to 155° F., placed in an activator for 30 seconds at 70° F. to 90° F., then in an accelerator solution for 2 minutes at 70° F. to 90° F., followed by a nickel plating solution for 7 minutes at 70° F. to 90° F. The samples were water rinsed between each step. The samples prepared were tested for metal to polymer adhesion using peel adhesion techniques described in ASTM D-429, Method B. All samples shown in Table II failed at the metal/polymer interface except sample 4 (50/50 MBAS/PVC which failed in the polymer layer, indicating excellent adhesion. Samples 4 and 5 also tested as non-burning in ASTM D-635-63.

Table I

| Compound Formulation for MBAS/PVC Blends | | | | | | | | |
|---|---|---|---|---|---|---|---|---|
| Material | 1 | 2 | 3 | 4 | 5 | 6 | 7 | 8 |
| Pliovic BK-80 (PVC) | 100 | 90 | 70 | 50 | 40 | 30 | 10 | — |
| P6448-157 (MBAS) | — | 10 | 30 | 50 | 60 | 70 | 90 | 100 |
| Mark 99 | 3.5 | → | → | → | → | → | → | → |
| Ferro 8V1 | 1.0 | | | | | | | |
| Wax OP | 0.6 | | | | | | | |
| Wax PA190 | 0.15 | | | | | | | |
| Hystyrene S-9718 | 0.3 | | | | | | | |

Table II, compounds 1 and 2 show no peel adhesion results for metal plating. These compounds contain high proportions of PVC and are therefore not metal platable, retaining the characteristics of PVC, which is well known to be unplatable.

MBAS blends are platable, but generally very poor peel adhesion is seen, as exemplified in compound 8. It is therefore very surprising that a particular combination of two unplatable or poorly platable materials produces metal platable compositions having good strength and high peel values such as exhibited in compounds 4 and 5. It is even more surprising that this combination of metal platability and high peel strength is is found in a transparent composition. Why this surprising result is obtained has not been determined.

TABLE II

| | Physical Properties on MBAS/PVC Blends | | | | | | | |
|---|---|---|---|---|---|---|---|---|
| Compound No. | 1 | 2 | 3 | 4 | 5 | 6 | 7 | 8 |
| PVC/XBAS | 100/0 | 90/10 | 70/30 | 50/50 | 40/60 | 30/70 | 10/90 | 0/100 |
| % BD in Blend | 0.0 | 1.7 | 5.1 | 8.5 | 10.3 | 11.9 | 15.4 | 18 |
| Notched Izod Impact | | | | | | | | |
| (R.T., $\frac{1}{8}$" bars) ft-lbs/in[a] | .6 | 0.9 | 3.8 | 4.2 | 6.3 | 3.5 | 2.8 | 3.50 |
| (−20° F., $\frac{1}{8}$" bars) ft-lbs/in[a] | — | 0.6 | 1.1 | 1.0 | 0.8 | 1.0 | 0.9 | — |
| (−40° F., $\frac{1}{8}$" bars) ft-lbs/in[a] | .6 | 0.6 | 0.8 | 0.6 | 0.6 | 1.7 | 0.6 | .75 |
| Gardner Impact to fracture (in-lbs) | 12 | 30 | | | | | | 30+ |
| Heat Distortion Temperature | | | | | | | | |
| (°C.) 264 psi fiber stress | 72 | 72 | 72 | 73 | 70 | 73 | 74 | 78 |
| Hardness (Shore D) | 85 | 84 | 85 | 82 | 81 | 81 | 81 | 80 |
| Hardness (Rockwell R) | 113 | 110 | 112 | 102 | 93 | 88 | 89 | 73 |
| Flexural Modulus ($E_B$) PSI × $10^{-5}$ | 4.5 | 3.9 | 3.5 | 3.3 | 3.0 | 2.8 | 2.9 | 3.2 |
| Flexural Strength (S) PSI × $10^{-3}$ | 14.0 | 12.8 | 11.3 | 9.9 | 9.3 | 8.9 | 8.7 | 8.0 |
| Light Transmission (%)[b] | 85 | 67 | 65 | 65 | 67 | 67 | 67 | 88 |
| Haze[b] (%) | | 40 | 40 | 47 | 51 | 48 | 35 | — |
| Flammability[c] | N.B. | N.B. | N.B. | N.B. | N.B. | 1.0 in/min | 2.0 in/min | — |
| Metal Peel Adhesion (lbs) | | .65 | 7.80 | 5.85 | .40 | | | .15 |

[a] Average of 10 samples (L and T).
[b] Obtained on $\frac{1}{8}$" sheets, molded on stainless steel (Gardner Color Difference Meter).
[c] N.B. refers to non-burning, others are approximate burn rate.

While certain representative embodiments and details have been shown for the purpose of illustrating the invention it will be apparent to those skilled in this art that various changes and modifications may be made therein without departing from the spirit or scope of the invention.

We claim:

1. A metal plated, non-burning highly light transmittant and impact resistant molded thermoplastic article consisting of:
   A. a molded substrate of metal platable, non-burning, high light transmittant and impact resistant thermoplastic material comprising a blend of
      (1) an admixture of
         (a) 100 parts by weight of a rubbery copolymer resulting from the copolymerization of a mixture of a diolefin monomer and a styrene monomer having grafted thereto from 30 to 50 parts by weight, based on 100 parts by weight of the grafted rubbery copolymer, of a terpolymer resulting from the copolymerization of a mixture of a methacrylic acid ester monomer, a styrene monomer and acrylonitrile monomer in the presence of said rubbery copolymer, and (b) from 100 to 200 parts by weight of a resinous terpolymer resulting from the copolymerization of a mixture of a methacrylic acid ester monomer, a styrene monomer and an acrylonitrile monomer, and wherein the total amount of the diolefin in the admixture of (1) ranges from about 10 to 30 parts by weight, the total amount of the styrene in the admixture of (1) ranges from about 30 to 40 parts by weight, the total amount of the methacrylic acid ester in the admixture of (1) ranges from about 20 to 25 parts by weight all based on 100 parts by weight of the total admixture of (1) and the total amount of the acrylonitrile in the admixture of (1) ranges from about 20 to 25 parts by weight based on 100 parts by weight of the total admixture of (1) and (2) a vinyl chloride polymer selected from the group consisting of vinyl chloride homopolymer and vinyl chloride copolymers containing up to about 15 parts by weight based on the weight of the copolymer of a copolymerizable comonomer and wherein the admixture of (1) ranges from about 40 to 60 parts by weight based on 100 parts by weight of the total blend and the vinyl chloride polymer of (2) ranges from about 60 to about 40 parts by weight based on 100 parts by weight of the total blend, and B. a metal coating deposited on and bonded to the surface of said molded substrate, said metal coating being selected from the group of metals consisting of copper, nickel chromium and alloys containing copper, nickel and chromium and wherein the peel adhesion strength between the metal coating and the thermoplastic substrate ranges from about 5.0 to about 10.0 pounds as measured by the ASTM D-429 Method B test procedure.

2. The metal plated, molded thermoplastic article of claim 1 wherein the molded substrate (a) comprises the blend of (1) the admixture of
  (a) 100 parts by weight of the rubbery copolymer resulting from the copolymerization of a mixture of butadiene and styrene monomer having grafted thereto from 30 to 50 parts by weight, based on 100 parts by weight of the grafted rubbery copolymer of the terpolymer resulting from the copolymerization of a mixture of methyl methacrylate, styrene and acrylonitrile monomers and
  (b) from 100 to 200 parts by weight of resinous terpolymer resulting from the copolymerization of a mixture of methyl methacrylate, styrene and acrylonitrile monomers, and
(2) vinyl chloride homopolymer.

3. The metal plated, molded thermoplastic article of claim 2 wherein the grafted rubbery copolymer (a) of the admixture of (1) of the blend is an 80/20 butadiene/styrene rubbery copolymer having grafted thereto a 30/40/30 methyl methacrylate/styrene/acrylonitrile terpolymer and wherein the resinous terpolymer (b) of the admixture of (1) of the blend is a 30/40/30 methylmethacrylate/styrene/acrylonitrile resinous terpolymer.

4. The metal plated, molded thermoplastic article of claim 3 wherein the grafted rubbery copolymer (a) of the admixture of (1) comprises 100 parts by weight and the resinous terpolymer (b) of the admixture of (1) comprises 189 parts by weight.

5. The metal plated, molded thermoplastic article of claim 4 wherein the admixture of (1) of the blend comprises 50 parts by weight based on 100 parts by weight of the total blend and the vinyl chloride homopolymer of (2) of the blend comprises 50 parts by weight based on 100 parts by weight of the total blend.

6. The metal plated, molded thermoplastic article of claim 2 wherein the metal coating of (B) deposited and bonded to the molded substrate of (A) is selected from the group of metals consisting of copper, nickel and chromium and wherein the thickness of said coating ranges from about 5 to 10 mils.

* * * * *